June 9, 1936.  R. E. MARBURY  2,043,834
AIR CONDITIONING APPARATUS
Filed June 14, 1934
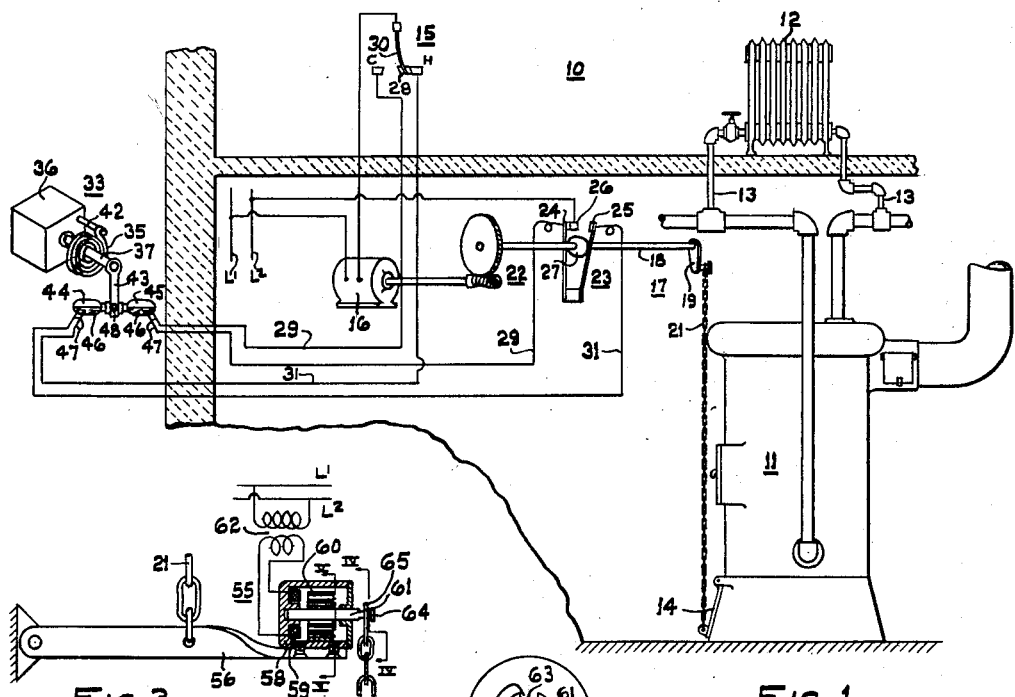
FIG. 1.
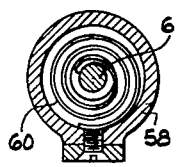
FIG. 3.
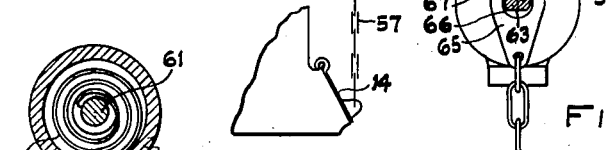
FIG. 4.
FIG. 5.
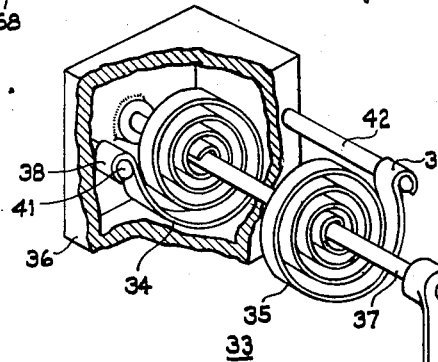
FIG. 2.
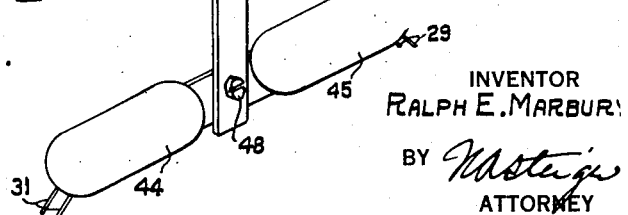
FIG. 6.
WITNESSES:
R. A. Rudge
E. Lutz
INVENTOR
RALPH E. MARBURY
BY
ATTORNEY Patented June 9, 1936

2,043,834

UNITED STATES PATENT OFFICE 2,043,834

AIR CONDITIONING APPARATUS

Ralph E. Marbury, Wilkinsburg, Pa., assignor to Westinghouse Electric & Manufacturing Company, East Pittsburgh, Pa., a corporation of Pennsylvania Application June 14, 1934, Serial No. 730,576

6 Claims. (Cl. 236—91)

My invention relates to systems for controlling the condition of air in an enclosure, and it has for an object to provide an improved system of this kind.

A further object of my invention is to provide a novel system of control, the action of which is anticipatively modified in response to changes in conditions of air exterior of the enclosure.

A still further purpose of the present invention is to effect certain operations of an air conditioning system in response to predetermined rates of change in temperature of air exterior of the enclosure.

Another object of my invention is to provide an improved control system for automatically controlling air heating apparatus in which the heating apparatus is adjusted for minimum heat supply in response to failure of motivating energy for the control system.

Another object of my invention is to provide a mechanism responsive to rate of change in temperature.

My invention is particularly applicable to air heating or cooling systems, wherein the apparatus for conditioning the air in the enclosure is controlled either manually or automatically, in response to the temperature of the air in the enclosure. The air conditioning apparatus, such as, for example, an air heating furnace, is adjusted, in response to a predetermined minimum temperature of the air in the enclosure, to increase the supply of heat to the enclosure, and to decrease the supply thereto when a higher temperature of air is obtained in the enclosure. In controlling systems of this kind in the past, no account has been taken of rapidly changing temperatures of the outside atmosphere, with the result that "over shooting" of the temperatures to be maintained in the enclosure may result. I propose to correct this defect, by modifying the operation of the furnace controlling means, such as, for example, the room or enclosure thermostat, by a device responsive to the rate of change in temperature of the outside atmosphere.

In practicing my invention, I dispose a device in the outside atmosphere, which device includes first and second thermal responsive elements connected in opposed relation to a common member or shaft. The arrangement is such, that when the elements are subjected to a similar temperature change, they tend to rotate the shaft in opposite directions. One of the thermal elements is lagged for retarding the flow of heat to and from the element, and, therefore, when the device is subjected to a change in temperature of the ambient atmosphere, the unlagged element reflects the change first and moves the shaft in one direction or the other, depending upon the direction of change in temperature. Switches operated by the shaft may be connected in the circuits of the room thermostat for modifying the controlling action thereof, so that operation of the furnace is effected with modifications, anticipatory of outside temperature changes.

As the change in temperature is reflected in the lagged element, it operates in an opposite direction to the unlagged element and returns the shaft and switches to their original or neutral position and thereby returns control of the furnace to the room thermostat. My novel device may be used as an indicating instrument, in which a pointer is actuated by the shaft and cooperates with indicia for indicating the rate of increase or decrease in temperature of the atmosphere.

These and other objects are effected by my invention, as will be apparent from the following description and claims taken in connection with the accompanying drawing, forming a part of this application, in which:

Fig. 1 is a diagrammatic view showing my novel control system applied to air heating apparatus;

Fig. 2 is an enlarged perspective view of an element of Fig. 1;

Fig. 3 is a diagrammatic view of a modified arrangement of some of the elements shown in Fig. 1;

Figs. 4 and 5 are sectional views taken along the lines IV—IV and V—V, respectively, of Fig. 3; and Fig. 6 is a view of an indicating instrument for indicating rates of change in temperature.

In Fig. 1, the numeral 10 indicates a room or enclosure to be heated. A furnace 11, shown by way of example, of the hot water type, is provided for heating the air in the room 10. A radiator 12 disposed within the room 10, is connected to the furnace 11 by means of conduits 13, thereby forming a circulating system for the heated water. The furnace 11 may be heated in any convenient manner and is disclosed by way of example, as a conventional coal burning furnace having a draft door 14 for regulating the fire.

The fire may be remotely controlled by a mechanism including a thermostat 15, disposed within the room 10, a motor 16 controlled by the thermostat 15, and a mechanical connection generally indicated at 17, between the motor 16 and the draft door 14. The connection 17 includes a shaft 18, a crank 19, and a chain 21 connected to the door 14. Gearing 22 is provided between the shaft of the motor 16 and the shaft 18 for effecting a speed reduction therebetween.

A switch 23 for limiting the energization of the motor 16 and the travel of the crank 19 is provided, and includes first and second movable contacts 24 and 25 and a stationary contact 26. A cam 27 fixed to the shaft 18 actuates the movable contacts 24 and 25.

The thermostat 15 includes stationary contacts C and H, and a movable contact 28, actuated by a bimetal strip 30 in response to the temperature of the air in the room 10. It may be of any suitable type known in the art, preferably a snap-acting type. The contact 28 engages the contact C when the room is at a predetermined low temperature and it engages contact H when at a predetermined high temperature. The room 10 is, therefore, maintained within a range of predetermined temperatures. Operating current for the motor 16 is obtained from line conductors $L_1$ and $L_2$.

Assume the apparatus is in the position shown in the drawing and that the contact 28 moves into engagement with contact C, a circuit is completed from line conductor $L_1$, motor 16, contacts 28 and C of the thermostat 15, a conductor 29, contacts 24 and 26 of the limit switch 23 to the other line conductor $L_2$. Operation of the motor 16 is initiated and it rotates the shaft 18 and crank 19 through 180° thereby opening the door 14. Operation of the motor 16 is terminated at the end of the 180° movement of the crank 19 as the cam 27 disengages contacts 24 and 26. The latter operation closes contacts 25 and 26, thereby conditioning the circuit including thermostat contact H for operation when the thermostat is satisfied. Opening of the fire door 14 increases the fire draft and the furnace 11 delivers heat to the room 10 at a higher rate.

As the temperature of the air in the room 10 reaches the desired degree, the contacts 28 and H are engaged and complete a circuit including line conductor $L_1$, motor 16, contacts 28 and H, a conductor 31, closed contacts 25 and 26, to the line conductor $L_2$. The motor 16 operates to rotate the shaft 18 and crank 19 through 180° to the position shown in the drawing in which the draft door 14 is closed. The supply of heat to the room 10 is, therefore, reduced. The circuit including the thermal contact C is again conditioned for operation when the thermostat 15 calls for heat.

A system operating as described will maintain the temperature of the enclosure or room 10 within a predetermined range of temperatures providing the temperature of the outside atmosphere is steady, or slowly fluctuating. Rapid fluctuations in temperature of the outside atmosphere may effect temperature overruns within the room 10 due to the variation in the temperature differential between the outside air and the air within the enclosure.

Assuming for example, that the enclosure is maintained at a mean temperature of 72° and that the outside atmosphere is at a temperature of 30°, the furnace is regulated by the thermostat 15 so that the heat output thereof is substantially equal to the heat loss from the enclosure, with the existing temperature differential of 42°. If the outside temperature increases or decreases slowly, the temperature differential will gradually change so that the room will have sufficient time to reflect the variation in the temperature differential and, therefore, the room thermostat will properly vary the heat output of the furnace to satisfy the new condition. The mean room temperature of 72° may therefore be maintained with slowly changing temperatures of the outside atmosphere.

A rapid rise in temperature of the outside atmosphere is accompanied by a rapid drop in the amount of heat required by the furnace, but, due to limited time available for the changed condition to be felt by the room and its thermostat, the rate of heat delivery by the furnace before the change, continues. After the room thermostat operates to terminate the delivery of heat to the room, the temperature of the room "overshoots" due to the surplus heat in the heating system or in the house mass. Several hours of discomfort may be felt by occupants of the enclosure before balanced conditions are again restored.

A rapidly falling temperature of the outside air causes a condition similar to that described in connection with a rapidly rising temperature. "Overshooting" of the temperature to be maintained in the room is, however, in the opposite direction. An increase in the temperature differential between the outside and the room air demands an increase in the amount of heat delivered to the room. If the drop in temperature outside is rapid, the room thermostat has insufficient time to recognize the new condition and the rate of heat delivery by the heating system is insufficient to satisfy the new demand. Accordingly, the room temperature is depressed to a relatively low value before balanced conditions are obtained.

In accordance with my invention, I propose to modify the controlling functions of the room thermostat during rapid fluctuations of the outside temperature. I, therefore, provide a device 33 subjected to the temperature of the outside atmosphere, and electrically connected in the controlling circuits of the thermostat 15. The device 33 includes thermal responsive elements 34 and 35, the first of which is lagged within a container 36. The elements 34 and 35 are connected together in opposed relation by a member or shaft 37; the arrangement being such that, when both elements 34 and 35 are subjected to a similar change in temperature, they tend to rotate the shaft 37 in opposite directions. It will be obvious, therefore, that, when the elements 34 and 35 have equal temperatures, the shaft 37 will assume a neutral position.

The stationary ends 38 and 39 of elements 34 and 35 are supported in any convenient manner as by fixed portions 41 and 42 of the device 33. The container 36 functions as heat lagging for the element 34 and retards the flow of heat to or from the element 34. The container 36 is formed of any suitable material and may be made of metal such as, for example, copper.

When the device 33 is subjected to an increase in temperature, it is first reflected in the element 35. As the container 36 retards the flow of heat to the element 34, a time delay between the change in temperature and the response by the element 34 is obtained. The duration of the time delay may be determined by the physical properties of the container 36. As the element 35 responds at once to the change in temperature, it rotates the shaft 37 in a counterclockwise direction as viewed in Fig. 2. As the element 34 slowly responds to the change, it rotates the shaft 37 in a clockwise direction, and, after it has attained the temperature of the element 35, the shaft 37 is returned to its neutral position.

A decrease in temperature of the ambient atmosphere causes the element 35 to rotate the shaft 37 in a clockwise direction. As the container 36 retards the flow of heat from the element 34 to the atmosphere, operation of the element 34 is delayed. Counterclockwise rotation of the shaft 37 is effected as the temperature of the element 34 is lowered, and, as it attains the temperature of the element 35, the shaft is in its neutral position.

Applying the device 33 to the temperature control system of Fig. 1, I provide an arm 43 on the shaft 37; which arm supports a pair of switches 44 and 45. The latter are disclosed as mercury switches and each includes a pool of mercury 46 and contacts 47 cooperating therewith. The arrangement of the switches 44 and 45 is such that both are closed when the arm 43 and shaft 37 are in the neutral position, and, as the shaft 37 rotates through a predetermined angle in a clockwise direction due to a rapid decrease in ambient temperature, the switch 44 opens. Conversely, movement of the shaft 37 in a counterclockwise direction moves the switch 45 in an opening direction. The switches 44 and 45 are connected in conductors 31 and 29, respectively.

The operation of the control system of Fig. 1 is as follows. In the position shown, the temperature of the outside atmosphere is steady, and the switches 44 and 45 are both closed; the arm 43 being in its neutral position. The heating system is, therefore, controlled by the thermostat 15 described heretofore. The circuits including the conductors 29 and 31 are both conditioned for normal operation. Heat is delivered to the room 10 at a rate sufficient to maintain it at a mean temperature of 72° or say, for example, between 71° and 73°.

Assume a rise in outside temperature, sufficiently rapid to effect opening of the switch 45, the circuit, including conductor 29 and contact C of the thermostat 15, will be open. Therefore, when the thermostat calls for heat and moves its contact 28 into engagement with contact C, it will be ineffective to open the draft door 14 of the furnace 11, until the rate of increase in outside temperature has been reduced to a value at which the switch 45 closes. Similarly a rapid decrease in temperature of the outside atmosphere, effects opening of the switch 44 so that, the thermostat 15 is ineffective to close the damper 14 until the rate of decrease in outside temperature has dropped to a predetermined value.

It will be apparent from the foregoing that the switch 45, when open, renders the thermostat incapable of opening the draft door 14 for increasing the heating effect of the heater. It will be noted, however, that opening of the switch 45 does not effect closure of the draft door 14 to reduce the heating effect of the furnace, but only prevents opening thereof. Also, when switch 44 is open, it prevents the thermostat 15 from closing the draft door 14, but does not effect opening of the door 14.

The device 33 functions to calibrate or modify the operation of the room thermostat 15 in an anticipatory manner, being responsive to rapid changes in temperature of the exterior air before said changes are reflected in the air within the room 10. Therefore, undesirable temperature "overshooting" in the room is prevented.

The switches 44 and 45 may be angularly adjusted with respect to the arm 43 in any convenient manner, as by a screw 48, whereby the rates of changes in ambient temperature at which the switches 44 and 45 open, may be varied.

Failure of the source of power for the control system described heretofore may cause serious overheating of the furnace and of the enclosure being heated, if the failure occurs during periods when the enclosure is calling for heat. During such periods the draft door 14 is open and, when the thermostat 15 becomes satisfied, absence of power renders the motor 16 incapable of moving the door 14 to its closed position. In Fig. 3, I have shown a device 55 responsive to the voltage of the line L1—L2 for maintaining the mechanical connection between the motor 16 and the draft door 14 intact.

In Fig. 3, the chain 21 is connected to a pivoted lever 56 upon which the device 55 is carried. A chain 57 extends from the device 55 to the draft door 14. The device 55 may include a casing 58 having an electrical heater 59 and a bimetal thermal element 60 disposed therein. The element 60 is secured at one end to the casing 58 and at its other end to a pin 61 journaled in the casing 56. The heater 59 is connected to the line L1—L2, preferably through a step down transformer 62. A portion of the pin 61 extends outside the casing 58, which portion has oppositely disposed flat sides 63 and a head 64. A link 65 is attached to the chain 57 and is supported by the pin 61 as best shown in Fig. 4. The link 65 has an opening 66 and a slot 67 formed therein.

During periods when the voltage of the line L1—L2 is above a predetermined value, the heater 59 is energized and heats the bimetal element 60. The latter, when heated, positions the pin 61 so that the flat sides 63 thereof are substantially at a right angle to the slot 67. As the pin 61 has a diameter larger than the width of the slot 67, the link 65 moves with the pin 61 as it is raised and lowered by the chain 21, thereby opening and closing the draft door 14.

During a power failure, the heater 59 is deenergized, and the element 60, in cooling, rotates the pin 61 so that its flat sides 63 align with the slot 67 thereby disengaging the link 65 from the pin 61. If the door 14 is open at this time, it is closed by gravity, so that overheating of the furnace is prevented.

It is desirable that disengagement of the pin 61 and link 65 be prevented during relatively short periods of power failure. This feature is provided by the device 55, due to the time delay between the power failure and cooling of the element 60 sufficiently to effect disengagement of the pin 61 and link 65. After the power supply is restored, the pin 61 is moved by the heated element 60 to the position shown, and the link 65 is then manually attached thereto.

As the position of the shaft 37 is responsive at all times to the rate of change in the ambient atmosphere, a pointer 50 may be fixed thereto for indicating the existing rate of change in temperature. In Fig. 6, I have shown an indicating instrument of this kind. A dial 51, preferably calibrated in degrees per hour, cooperates with the pointer 50. The calibrations are arranged on each side of the neutral or zero position, as shown; one group indicating an increase in temperature and a second group a decrease. The position of the pointer 50 in Fig. 6 indicates that the temperature is dropping at the rate of 2° per hour.

While I have shown the control circuits for the furnace automatically controlled by a thermostat, it will be understood that they may be manually controlled. Furthermore, I have disclosed my novel control system applied to a coal fired hot water furnace, but other types of heat generators may be used without departing from the spirit and scope of my invention. The control device 33 as disclosed, includes thermal responsive elements of the bimetal type, but it is to be understood that elements of other types such as, for example, expansible bellows or electrical resistances, may be employed.

While I have shown my invention in two forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a system for controlling the temperature of air in an enclosure, the combination of a heater for heating said air, a mechanism associated with said heater for varying the heating effect thereof, a thermostat responsive to the temperature of the air in the enclosure for controlling the operation of said mechanism, electrical connections between said thermostat and said mechanism, switching means in the electrical connections, and means responsive to a predetermined rate of change in the temperature of air exterior of the enclosure for actuating the switching means, whereby the controlling effect of said thermostat is modified.

2. In a system for controlling the temperature in an enclosure, the combination of a furnace for supplying heat to the enclosure, means responsive to a predetermined minimum temperature in the enclosure for increasing the rate of combustion in the furnace to a relatively high value, means responsive to a predetermined maximum temperature in the enclosure for decreasing the rate of combustion to a relatively low value, means operable automatically in response to a predetermined rate of increase in temperature of the air exterior of the enclosure and independently of the temperature in the enclosure to render the first-mentioned means ineffective to increase the rate of combustion and operable automatically in response to a predetermined rate of decrease in temperature of the air exterior of the enclosure and independently of the temperature in the enclosure to render the second-mentioned means ineffective to reduce the rate of combustion.

3. In a system for controlling the temperature of the air in an enclosure, the combination of a heater for heating said air, a thermostat responsive to the temperature of the air in said enclosure and movable to a first position when the temperature of the air in the enclosure is below a predetermined degree and movable to a second position when the temperature of the air in the enclosure above a predetermined degree, means effective in the first position of the thermostat for increasing the heating effect of the heater, means effective in the second position of said thermostat for decreasing the heating effect of the heater, and means responsive to a predetermined rate of increase in temperature of air exterior of the enclosure for rendering said first-mentioned means ineffective, and responsive to a predetermined rate of decrease in temperature of said exterior air for rendering said second-mentioned means ineffective.

4. In a system for controlling the temperature of the air in an enclosure, the combination of a heater for heating said air, a thermostat responsive to the temperature of the air in said enclosure and movable to a first position when the temperature of the air in the enclosure is below a predetermined degree and movable to a second position when the temperature of the air in the enclosure above a predetermined degree, means effective in the first position of the thermostat for increasing the heating effect of the heater, means effective in the second position of said thermostat for decreasing the heating effect of the heater, and means responsive to a predetermined rate of decrease in temperature of air exterior of the enclosure for rendering said second-mentioned means ineffective.

5. In a system for controlling the temperature of the air in an enclosure, the combination of a heater for supplying heat to said air, a thermostat responsive to the temperature of the air in said enclosure, first and second electric circuits controlled by said thermostat for controlling the operation of said heater, said first circuit being conditioned to increase the supply of heat when the temperature of the air in the enclosure is below a predetermined degree, said second circuit being conditioned to decrease the supply of heat when the temperature of the air in the enclosure is above a predetermined degree, first and second switches respectively connected in the first and second circuits, and means responsive to a predetermined rate of increase in temperature of air exterior of the enclosure for opening said first switch and responsive to a predetermined rate of decrease in temperature of said exterior air for opening said second switch; said last-mentioned means including a plurality of thermostatic elements, heat lagging for one of said elements and a connection between the elements for operating the switches.

6. In a system for controlling the temperature of the air in an enclosure, the combination of a heater for supplying heat to said air, a thermostat responsive to the temperature of the air in said enclosure, first and second electric circuits controlled by said thermostat for controlling the operation of said heater, said first circuit being conditioned to increase the supply of heat when the temperature of the air in the enclosure is below a predetermined degree, said second circuit being conditioned to decrease the supply of heat when the temperature of the air in the enclosure is above a predetermined degree, first and second switches respectively connected in the first and second circuits, and means responsive to a predetermined rate of decrease in temperature of air exterior of the enclosure for opening said second switch to prevent decrease in the supply of heat.

RALPH E. MARBURY.